(12) United States Patent
Sakai et al.

(10) Patent No.: US 11,629,889 B2
(45) Date of Patent: Apr. 18, 2023

(54) GEOTHERMAL HEAT UTILIZATION SYSTEM AND GEOTHERMAL HEAT UTILIZATION METHOD

(71) Applicants: MITSUBISHI HEAVY INDUSTRIES THERMAL SYSTEMS, LTD., Tokyo (JP); OSAKA CITY UNIVERSITY, Osaka (JP); NEWJEC INC., Osaka (JP); THE KANSAI ELECTRIC POWER CO., INC., Osaka (JP); MORIKAWA SAKUSEN INDUSTRIES CO., LTD., Settsu (JP)

(72) Inventors: Masanobu Sakai, Tokyo (JP); Takeshi Fuchimoto, Tokyo (JP); Rinnichi Sai, Tokyo (JP); Masaki Nakao, Osaka (JP); Kazuhiro Nakamura, Osaka (JP); Yasuhisa Nakaso, Osaka (JP); Toshihide Morikawa, Osaka (JP); Shinsuke Sakae, Osaka (JP)

(73) Assignees: MITSUBISHI HEAVY INDUSTRIES THERMAL SYSTEMS, LTD., Tokyo (JP); OSAKA CITY UNIVERSITY, Osaka (JP); NEWJEC INC., Osaka (JP); THE KANSAI ELECTRIC POWER CO., INC., Osaka (JP); MORIKAWA SAKUSEN INDUSTRIES CO., LTD., Settsu (JP)

( * ) Notice: Subject to any disclaimer, the term of this patent is extended or adjusted under 35 U.S.C. 154(b) by 626 days.

(21) Appl. No.: 16/498,327

(22) PCT Filed: Mar. 28, 2018

(86) PCT No.: PCT/JP2018/012990
§ 371 (c)(1),
(2) Date: Sep. 26, 2019

(87) PCT Pub. No.: WO2018/181586
PCT Pub. Date: Oct. 4, 2018

(65) Prior Publication Data
US 2020/0025419 A1   Jan. 23, 2020

(30) Foreign Application Priority Data

Mar. 31, 2017   (JP) .............................. JP2017-073194

(51) Int. Cl.
*F24T 10/20*   (2018.01)
(52) U.S. Cl.
CPC .................................. *F24T 10/20* (2018.05)
(58) Field of Classification Search
None
See application file for complete search history.

(56) References Cited

U.S. PATENT DOCUMENTS 3,757,516 A * 9/1973 McCabe ................. F24T 10/20
165/45
4,157,730 A   6/1979 Despois et al.
(Continued)

FOREIGN PATENT DOCUMENTS

EP   2913614 A2   9/2015
JP   57-175667 A   10/1982
(Continued)

OTHER PUBLICATIONS

Written Opinion of the International Searching Authority and International Search Report, dated Jun. 12, 2018, for International Application No. PCT/JP2018/012990, with English translations.

*Primary Examiner* — Andrew Sue-Ako
(74) *Attorney, Agent, or Firm* — Birch, Stewart, Kolasch & Birch, LLP

(57) ABSTRACT

A geothermal heat utilization system (10) includes a pumping well (20), a water injection well (30), a pipe (13) having two ends which are immersed in water stored in the pumping well (20) and the water injection well (30) so as to connect the pumping well (20) and the water injection well (30) to each other, a pump (21) and a pump (31) which are respectively provided inside the pumping well (20) and the water injection well (30) and pump up stored water through the pipe (13), a valve (25) and a valve (35) which are respectively provided on a pressurization side of the pump (21)

(Continued)

inside the pumping well (20) and a pressurization side of the pump (31) inside the water injection well (30), and a heat exchanger (14) which is configured to exchange heat with the pipe (13).

14 Claims, 7 Drawing Sheets

(56) References Cited

U.S. PATENT DOCUMENTS

| | | | | |
|---|---|---|---|---|
| 4,283,915 A | * | 8/1981 | McConnell | F03G 7/04 |
| | | | | 60/530 |
| 4,299,270 A | * | 11/1981 | McGrath | F28D 20/0052 |
| | | | | 165/104.31 |
| 4,693,300 A | | 9/1987 | Adachi | |
| 6,615,601 B1 | * | 9/2003 | Wiggs | F25B 27/005 |
| | | | | 62/235.1 |
| 2003/0226761 A1 | * | 12/2003 | Featherstone | B01D 11/0492 |
| | | | | 205/540 |

FOREIGN PATENT DOCUMENTS

| | | |
|---|---|---|
| JP | 58-69721 U | 5/1983 |
| JP | 62-141460 A | 6/1987 |
| JP | 2005-207718 A | 8/2005 |
| JP | 2008-14530 A | 1/2008 |
| JP | 2015-161463 A | 9/2018 |

\* cited by examiner

GEOTHERMAL HEAT UTILIZATION SYSTEM AND GEOTHERMAL HEAT UTILIZATION METHOD

TECHNICAL FIELD

The present invention relates to a geothermal heat utilization system and a geothermal heat utilization method.

The application is based on Japanese Patent Application No. 2017-073194 filed on Mar. 31, 2017, the content of which is incorporated herein by reference.

BACKGROUND ART

In recent years, a geothermal heat utilization system that pumps up underground water in an aquifer from wells and uses the underground water as hot heat sources or cold heat sources have been proposed.

In the related art, Patent Document 1 discloses a geothermal heat utilization system that uses underground water pumped up from a well as a heat source for heating and cooling a facility through a heat exchanger. In the system disclosed in Patent Document 1, the pumped-up underground water is subjected to heat exchange, injected into another well, and returned underground again in order to pay heed to the balance in the amount of heat accumulated underground.

CITATION LIST

Patent Literature

[Patent Document 1]
Japanese Unexamined Patent Application, First Publication No. 2015-161463

SUMMARY OF INVENTION

Technical Problem

However, pumped-up underground water is exposed to the atmosphere, and thus the underground water is oxidized and gas components in the underground water are volatilized. For this reason, when underground water which is temporarily pumped up is returned to a well, bubbles are generated. Therefore, the well may be closed due to the generated bubble, and the efficiency of injection into the well may be reduced.

An object of the present invention is to limit a reduction in the efficiency of water injection when pumped-up stored water is returned to a well.

Solution to Problem

A geothermal heat utilization system according to a first aspect includes a pair of wells, a pipe having two ends which are immersed in water stored in both of the wells so as to connect the pair of wells to each other, a pair of pumps which are provided in the respective wells and pump up the stored water through the pipe, valves each of which is provided on pressurization sides of the pump in one of the pair of wells, and a heat exchanger which is configured to exchange heat with the pipe.

According to the present aspect, it is possible to pump up water stored in the well inside the pressurized pipe and to return the water stored in the pressurized pipe to the well. For this reason, the geothermal heat utilization system can limit the exposure of stored water, which is to be returned to the well, to air and the volatilization of gas components from stored water to be returned to the well. Therefore, the geothermal heat utilization system can limit the generation of bubbles when the pumped-up stored water is returned to the well, and thus it is possible to limit a reduction in the efficiency of water injection of the pumped-up stored water into the well.

In the geothermal heat utilization system according to a second aspect, at least one of the valves includes a check valve which is capable of being pressurized from the pump to the pipe.

According to the present aspect, stored water pressurized by the pump is pumped up into the pipe through the check valve, and water, which is temporarily pumped up into the pipe, is stopped inside the pipe using the check valve. For this reason, the geothermal heat utilization system can maintain a predetermined pressure of water stored in the pipe. Therefore, the geothermal heat utilization system can limit the generation of bubbles when pumped-up stored water is returned to the well.

In the geothermal heat utilization system according to a third aspect, at least one of the valves includes a water injection valve which is opened at a set pressure, and the set pressure is higher than an operating pressure of the check valve, the operating pressure which is applied from the pump to the pipe.

According to the present aspect, it is possible to return pumped-up stored water from the pipe to the well in a state where a set pressure is applied. Therefore, the geothermal heat utilization system can limit the generation of bubbles when the pumped-up stored water is returned to the well, and thus it is possible to limit a reduction in the efficiency of water injection of the pumped-up stored water into the well.

In the geothermal heat utilization system according to a fourth aspect, at least one of the valves includes a water injection valve, the geothermal heat utilization system further comprises a pressure gauge which is configured to determine a pressure in the pipe and a water injection valve control unit which is configured to control the water injection valve in relation to the determined pressure, and the water injection valve control unit is configured to perform control of opening the water injection valve provided inside one well with respect to the other well operating the pump out of the pair of wells when the determined pressure reaches a predetermined pressure.

According to the present aspect, it is possible to return water stored in the well which is pumped up into the pipe to the well while controlling water injection related to a determined pressure in the pipe. For this reason, the geothermal heat utilization system can maintain water stored in the pipe at a predetermined pressure. Therefore, the geothermal heat utilization system can limit the generation of bubbles when pumped-up stored water is returned to the well.

A geothermal heat utilization system according to a fifth aspect further includes an accumulator pressure tank in the pipe.

According to the present aspect, stored water pressurized by the pump is stored in the accumulator pressure tank in addition to the pipe. For this reason, the geothermal heat utilization system can maintain the pressure of stored water in the pipe. Therefore, the geothermal heat utilization system can limit the generation of bubbles when the pumped-up stored water is returned to the well.

A geothermal heat utilization system according to a sixth aspect further includes a lid in an opening in an upper portion of at least one well out of the wells.

According to the present aspect, the lid provided in the opening in the upper portion of the well prevents the inside of the well from being exposed to air and prevents gas in the well from being discharged to air. For this reason, the geothermal heat utilization system limits the exposure of water stored in the well and water injected into the well from the pipe to air and limits the volatilization of gas components from water stored in the well and water injected into the well from the pipe. Further, the lid provided at the opening in the upper portion of the well maintains a pressure on the surface of water stored in the well, and thus the geothermal heat utilization system can limit a fluctuation in the level of water stored in the well.

Therefore, the geothermal heat utilization system can limit the generation of bubbles when pumped-up stored water is returned to the well.

A geothermal heat utilization method according to a seventh aspect includes an in-pipe pressurization step of pumping up the stored water into the pipe using the pump provided in one of the pair of wells to pressurize an inside of the pipe, and a heat exchange step of further pumping up the stored water into the pipe using the pump provided in one of the pair of wells after the in-pipe pressurization step to inject the stored water into the other well and perform heat exchange between the pipe and the heat exchanger.

According to the present aspect, it is possible to pump up water stored in the well inside the pressurized pipe and to return the water stored in the pressurized pipe to the well. For this reason, in the geothermal heat utilization method, it is possible to limit the exposure of stored water, which is to be returned to the well, to air and the volatilization of gas components from stored water to be returned to the well. Therefore, in the geothermal heat utilization method, it is possible to limit the generation of bubbles when the pumped-up stored water is returned to the well, and thus it is possible to limit a reduction in the efficiency of water injection of the pumped-up stored water into the well.

Advantageous Effects of Invention

According to the above-described geothermal heat utilization system, it is possible to limit a reduction in the efficiency of water injection when pumped-up stored water is returned to a well.

DESCRIPTION OF EMBODIMENTS

Hereinafter, an embodiment according to the present invention will be described using the accompanying drawings.

EMBODIMENT

An embodiment of a geothermal heat utilization system according to the present invention will be described with reference to FIGS. 1 to 5.

(Configuration of Geothermal Heat Utilization System)

Figure 1:
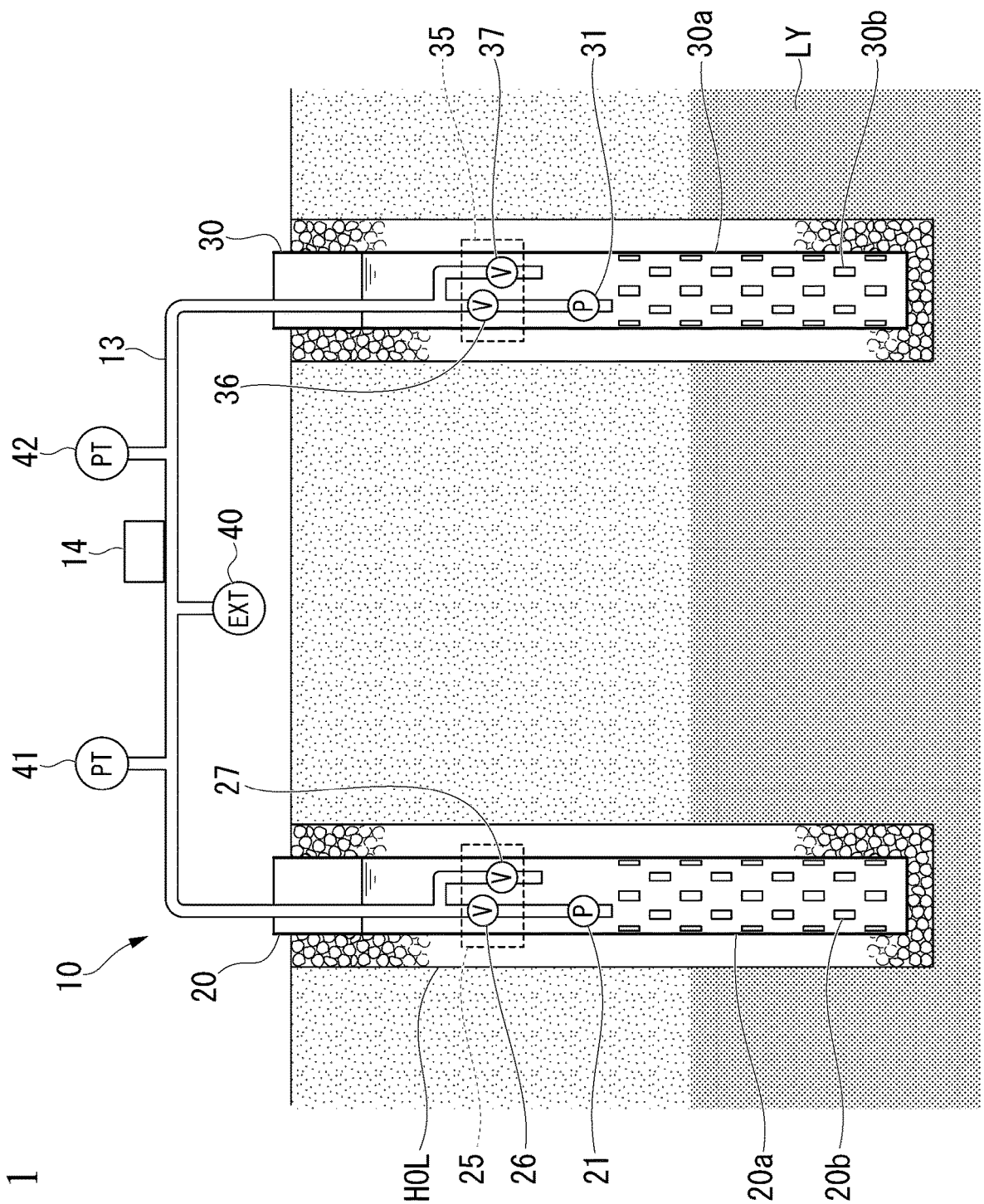
FIG. 1 is a schematic view of a geothermal heat utilization system according to an embodiment of the present invention.

As shown in FIG. 1, a geothermal heat utilization system 10 includes a pumping well 20 and a water injection well 30 which are paired, a pipe 13 having two ends which are immersed in water stored in the pumping well 20 and the water injection well 30 so as to connect the pumping well 20 and the water injection well 30 to each other, and a heat exchanger 14 that exchanges heat with the pipe 13.

The geothermal heat utilization system 10 further includes a pump 21 which is provided in the pumping well 20 on a side of the pumping well 20 and pumps up water stored in the pumping well 20 through the pipe 13, and a valve 25 which is provided on a pressurization side of the pump 21 in the pumping well 20. In the present embodiment, the valve 25 is provided above the pump 21.

Therefore, in the geothermal heat utilization system 10, water stored in the pumping well 20 is pumped up by the pipe 13, and heat exchange is performed between the heat exchanger 14 and the pumped-up water stored in the pumping well 20 through the pipe 13. The stored water having been subjected to heat exchange is injected into the water injection well 30 through the pipe 13.

In addition, the geothermal heat utilization system 10 further includes a pump 31 which is also provided in the water injection well 30 on a side of the water injection well 30 and pumps up water stored in the water injection well 30 through the pipe 13, and a valve 35 which is provided on a pressurization side of the pump 31 in the water injection well 30. In the present embodiment, the valve 35 is provided above the pump 31. Therefore, in the geothermal heat utilization system 10, water stored in the water injection well 30 is pumped up into the pipe 13, and heat exchange can also be performed between the heat exchanger 14 and the pumped-up water stored in the water injection well 30 through the pipe 13. The stored water having been subjected to heat exchange is injected into the pumping well 20 through the pipe 13.

In this manner, in the present embodiment, although the wells of the geothermal heat utilization system 10 are called the "pumping well 20" and the "water injection well 30", the geothermal heat utilization system 10 not only uses stored water pumped up from the pumping well 20 as heat, but also uses stored water pumped up from the water injection well 30 as heat. However, in order to simply the following description, a case where water stored in the pumping well 20 is pumped up by the pipe 13 and is subjected to heat exchange will be mainly described.

The geothermal heat utilization system 10 further includes an accumulator pressure tank 40, and pressure gauges 41 and 42 which are provided on both sides of the accumulator pressure tank 40 and detect a pressure in the pipe 13.

The pumping well 20 includes a casing 20a embedded in an excavation hole HOL excavated toward the underground from the ground surface to an aquifer LY. The casing 20a is provided with strainer (screen) 20b constituted by, for example, a plurality of slits. The pumping well 20 is configured such that underground water in the aquifer LY can be taken into the casing 20a and stored water can be returned to the aquifer LY from the inside of the casing 20a by the strainer 20b.

Similarly, the water injection well 30 also includes a casing 30a provided with a strainer (screen) 30b, and is configured such that underground water in the aquifer LY can be taken into the casing 30a and stored water can be returned to the aquifer LY from the inside of the casing 30a.

The valve 25 includes a check valve 26 and a water injection valve 27. The check valve 26 and the water injection valve 27 are provided at branch destinations of the pipe 13 which branches out into two parts toward a tip end of the pipe 13. The check valve 26 and the water injection valve 27 are immersed in water stored in the pumping well 20.

Similarly, the valve 35 also includes a check valve 36 and a water injection valve 37. The check valve 36 and the water injection valve 37 are provided in the middle of the branch destinations of the pipe 13 which branches out into two parts toward the tip end of the pipe 13. The check valve 36 and the water injection valve 37 are immersed in water stored in the water injection well 30.

The check valve 26 is provided between the pump 21 and the pipe 13 and makes the direction of flowing water one-way. Specifically, the check valve 26 is provided such that water flows from the pump 21 to the pipe 13 and does not flow from the pipe 13 to the pump 21. Thereby, as will be described later, the flow of water in the pipe 13 is blocked at least from the pipe 13 to the water injection valve 27 and the valve 35, so that the check valve 26 is configured to be capable of being pressurized from the pump 21 to the pipe 13, thereby forming a pressurized and sealed circuit.

Similarly, the check valve 36 is also provided such that water flows from the pump 31 to the pipe 13 and does not flow from the pipe 13 to the pump 31.

The water injection valve 37 is configured such that water in the pipe 13 is injected into the water injection well 30. The water injection valve 37 releases water in the pipe 13 from the pipe 13 to the water injection well 30 when a pressure in the pipe 13 becomes higher than a set pressure. Thereby, water in the pipe 13 is injected into the water injection well 30.

Similarly, the water injection valve 27 is configured to inject water in the pipe 13 into the pumping well 20, and the water injection valve 27 injects water from the pipe 13 to the pumping well 20 when a pressure in the pipe 13 becomes higher than a set pressure.

Here, a relationship between an operating pressure of the check valve 26 and a set pressure of the water injection valve 37 will be described.

When a pressure applied from the pump 21 to the pipe 13 reaches an operating pressure of the check valve 26, the check valve 26 releases water from the pump 21 to the pipe 13. In addition, when the check valve 26 releases water, an operating pressure is applied from the pump 21 to the pipe 13.

In the present embodiment, a set pressure for allowing the water injection valve 37 to release water is set to be higher than an operating pressure of the check valve 26. Therefore, when a pressure applied from the pump 21 to the pipe 13 reaches an operating pressure of the check valve 26, a pressure in the pipe 13 becomes an operating pressure of at least the check valve 26.

When a pressure applied from the pump 21 to the pipe 13 is further increased by the pump 21, a pressure in the pipe 13 is increased to a set pressure of the water injection valve 37. When a pressure in the pipe 13 becomes higher than a set pressure of the water injection valve 37, the water injection valve 37 releases water in the pipe 13 from the pipe 13 to the water injection well 30 as described above.

Therefore, when a set pressure of the water injection valve 37 is set to be a pressure capable of limiting the generation of bubbles of stored water, the geothermal heat utilization system 10 can inject pumped-up water stored in the pipe 13 into the water injection well 30 while limiting the generation of bubbles.

Meanwhile, when a set pressure for releasing water by the water injection valve 27 is set to be a pressure higher than a set pressure for releasing water by the water injection valve 37 in a case where water is injected into the water injection well 30, the geothermal heat utilization system 10 can inject water into the water injection well 30 while limiting the generation of bubbles.

This is the same for a relationship between an operating pressure of the check valve 36 and a set pressure of the water injection valve 27.

The accumulator pressure tank 40 stores pumped-up stored water and limits a fluctuation in pressure in the pipe 13. Thereby, the geothermal heat utilization system 10 limits a fluctuation in pressure due to turn-on/turn-off of the pump 21 or the pump 31.

Figure 2:
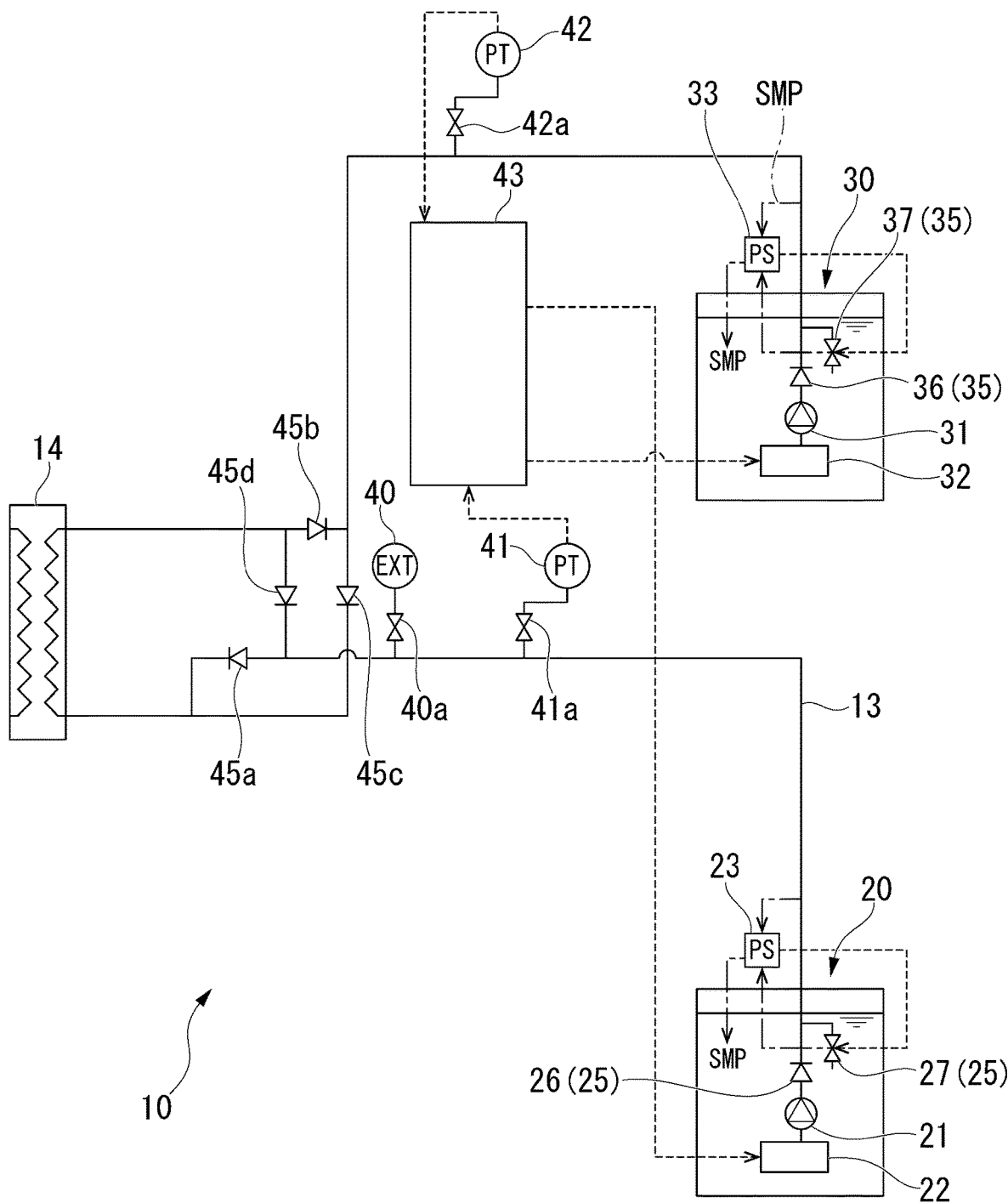
FIG. 2 is a system diagram of the geothermal heat utilization system according to the embodiment of the present invention.

As shown in FIG. 2, the accumulator pressure tank 40, the pressure gauge 41, and the pressure gauge 42 are connected to the pipe 13 through a regulating valve 40a, a regulating valve 41a, and a regulating valve 42a, respectively.

Pressures detected by the pressure gauge 41 and the pressure gauge 42 are transmitted to a central control unit 43 in response to a signal. The central control unit 43 transmits control signals to a pump control unit 22 and a pump control unit 32 in relation to the determined pressures. The pump control unit 22 controls the turn-on/turn-off of the pump 21 and the output of the pump. Similarly, the pump control unit 32 controls the turn-on/turn-off of the pump 31 and the output of the pump.

As shown in FIG. 2, the geothermal heat utilization system 10 according to the present embodiment further includes a water injection valve control unit 23 that controls the water injection valve 27 and a water injection valve control unit 33 that controls the water injection valve 37.

The water injection valve control unit 33 changes a set pressure of the water injection valve 37 according to properties and water quality of the underground water. In the present embodiment, for example, an initial set value of a set pressure is a gauge pressure of +60 kPa. However, in a case where quality of underground water is a carbonated spring, hot water, or the like which easily generates bubbles, the water injection valve control unit 33 increases a set pressure from the gauge pressure of +60 kPa which is an initial set value and limits the generation of bubbles.

In contrast, in a case where bubbles are not generated, the water injection valve control unit 33 decreases a set value from the gauge pressure of +60 kPa which is an initial set value and reduces the total pump head of the system of the pipe 13 to reduce power consumption of the pump 21.

In the present embodiment, water in the pipe 13 is sampled as a sample SMP from above the water injection well 30 or from the inside of the pipe 13 in vicinity of the valve 35, and bubble generation conditions during the operation of the geothermal heat utilization system 10 are checked. The bubble generation conditions may be checked by a person, but the water injection valve control unit 33 may monitor the sample SMP, for example, as indicated by an alternating dotted-dashed arrow in FIG. 2. When the water injection valve control unit 33 performs signal processing using an optical sensor or ultrasound waves and image processing using a camera and determines bubble generation conditions of the sample SMP, the water injection valve control unit 33 can also control a set pressure of the water injection valve 37 in relation to the bubble generation conditions.

This is the same for the water injection valve control unit 23.

Meanwhile, the sample SMP may be discarded after bubble generation conditions are checked, or may be returned to a well as shown in FIG. 2.

As shown in FIG. 2, in the present embodiment, check valves 45a to 45d may be provided such that water flows in the same direction as the heat exchanger 14 even when water is pumped up from the pumping well 20 and pumped up from the water injection well 30.

For example, in a case where water is pumped up from the pumping well 20, water in the pipe 13 is injected into the water injection well 30 from the pumping well 20 through the check valve 45a, the heat exchanger 14, and the check valve 45b in this order. In this case, since a pressure in the pipe 13 is higher on an upstream side (the pumping well 20 side) of the heat exchanger 14 than on a downstream side, water does not flow to the check valve 45c and the check valve 45d.

Similarly, in a case where water is pumped up from the water injection well 30, water in the pipe 13 is injected into the pumping well 20 from the water injection well 30 through the check valve 45c, the heat exchanger 14, and the check valve 45d in this order. In this case, since a pressure in the pipe 13 is higher on an upstream side (the water injection well 30 side) of the heat exchanger 14 than on a downstream side, water does not flow to the check valve 45a and the check valve 45b.

Figure 3:
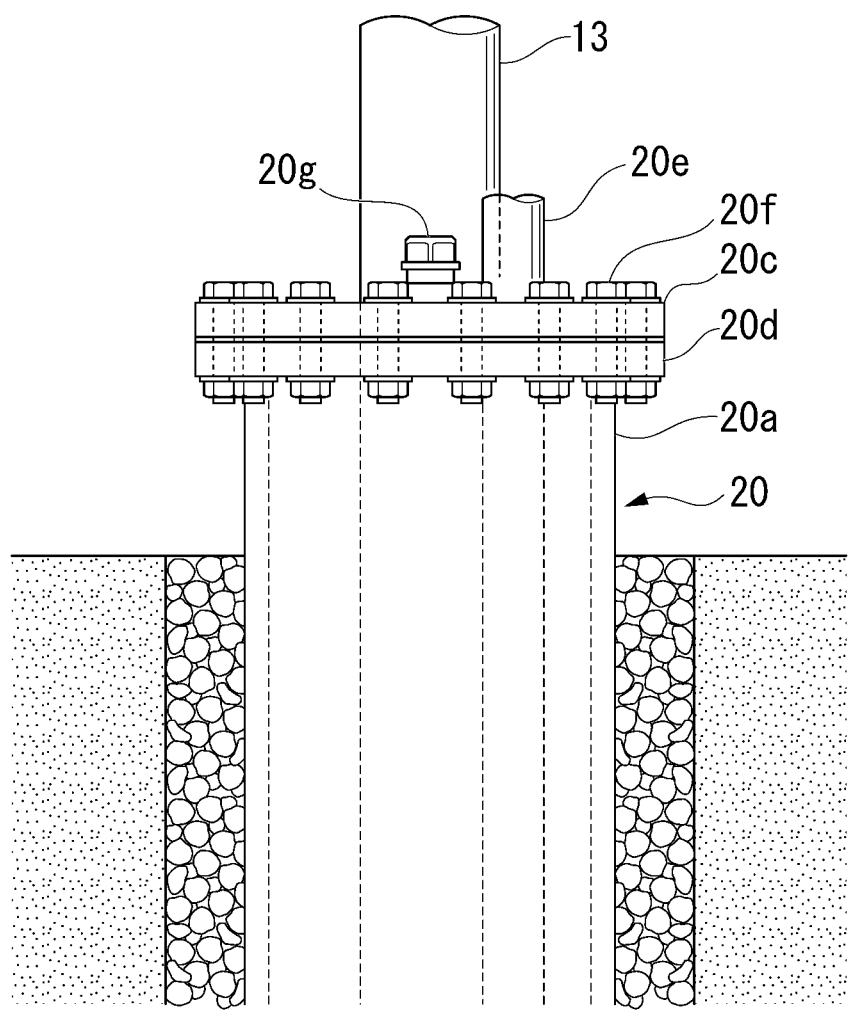
FIG. 3 is a side view of a pumping well of the geothermal heat utilization system according to the embodiment of the present invention.

As shown in FIG. 3, in the present embodiment, a lid 20c is provided at an opening in an upper portion of the pumping well 20 (casing 20a). In the present embodiment, a flange is provided at an opening in an upper portion of the casing 20a, and the lid 20c is fastened together with the flange using bolts 20f, so that an upper portion in the pumping well 20 is sealed. Thereby, free replacement of air in the casing 20a with the outside air is mainly limited.

In addition, a safety valve is installed at an upper portion of the casing 20a in order to maintain a pressure in the pumping well 20 in a safe range with respect to a change in the pressure in the pumping well 20 accompanying a change in a water level during pumping and water injection. In the present embodiment, as shown in FIG. 3, a safety valve 20g is provided in a lid 20c. Further, a cable 20e for a power supply and control is introduced into the casing 20a through the lid 20c while holding sealing by the lid 20c.

The lid 20 prevents the inside of the pumping well 20 from being exposed to air and gas inside the pumping well 20 from being discharged to air. For this reason, the exposure of water stored in the pumping well 20 and water injected into the pumping well 20 from the pipe 13 to air and the volatilization of gas components from water stored in the pumping well 20 and water injected into the pumping well 20 from the pipe 13 are limited. In addition, the lid 20c can limit contact of the stored water with air inside the casing 20a, and thus it is possible to limit the generation of fine particles such as those of iron oxide.

Further, the lid 20c maintains a pressure on the surface of water stored in the pumping well 20, so that the geothermal heat utilization system 10 can limit fluctuation in the level of water stored in the pumping well 20.

For example, when the surface of water stored in the pumping well 20 is lowered due to pumping, a pressure in a space on the surface of stored water sealed by the lid 20c is lowered. When a pressure is lowered, underground water in the aquifer LY is drawn due to the lowered pressure, and underground water is replenished into the casing 20a from the strainer 20b. For this reason, the lowering of the surface of water stored in the pumping well 20 due to water injection is limited.

In contrast, when the surface of water stored in the pumping well 20 rises due to water injection, a pressure in a space on the surface of stored water sealed by the lid 20c is increased. When a pressure is increased, the water stored in the pumping well 20 is pushed out to the aquifer LY due to the increased pressure, and the stored water is discharged from the strainer 20b to the aquifer LY. For this reason, a rise in the surface of water stored in the pumping well 20 due to water injection is limited.

This is the same as for an opening in an upper portion of the water injection well 30 (casing 30a).

(Pressure Holding Control when Pump is Stopped)

The geothermal heat utilization system 10 according to the present embodiment performs pressure holding control inside the pipe 13 when the pump is stopped.

As described above, bubbles generated in association with a reduction in pressure inside the pipe 13 block a well, which results in a reduction in the efficiency of water injection into the well. Although a pressure in the pipe 13 during the operation of the well is secured at a set pressure or higher by functions of valves and pumps, automatic control for holding a pressure in the pipe 13 is separately required for a case where the pump is stopped. The holding of a pressure in the pipe 13 is controlled in accordance with a pressure detected by the pressure gauge 41 or the pressure gauge 42 provided in the vicinity of the accumulator pressure tank 40.

Figure 4:
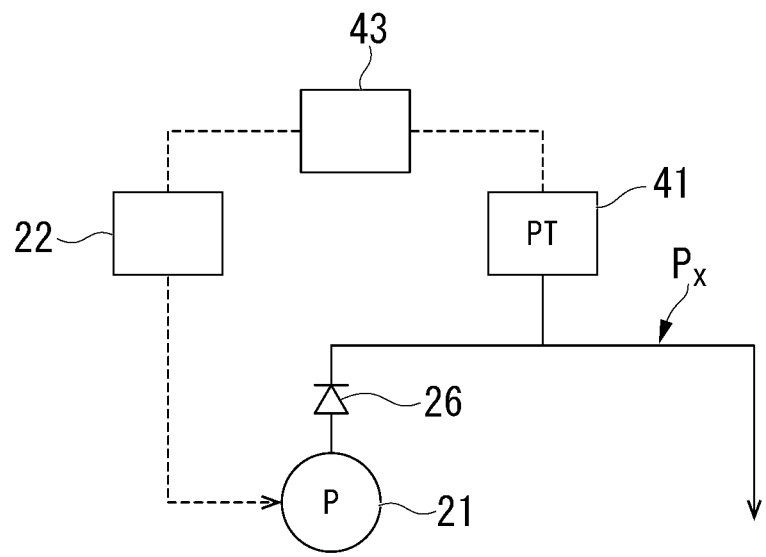
FIG. 4 is a system diagram showing pressure holding control according to the embodiment of the present invention.
Figure 5:
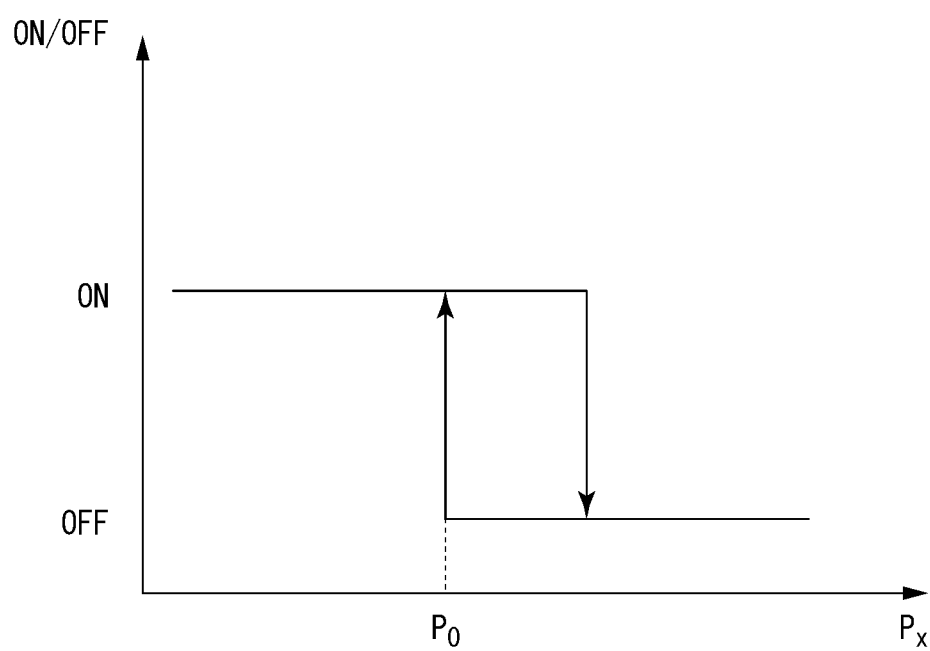
FIG. 5 is a graph showing pressure holding control according to the embodiment of the present invention.

As shown in FIG. 4, for example, a pressure Px detected by the pressure gauge 41 is transmitted to the central control unit 43 in response to a signal. After the pump 21 is stopped, the pressure Px in the pipe 13 is decreased with the elapse of time as shown in FIG. 5. When the central control unit 43 determines that the determined pressure Px has become lower than a pressure Po to be held, the central control unit instructs the pump control unit 22 to turn on the pump 21. The instructed pump control unit 22 turns on the pump 21 to hold the pressure Po to be held. The pressure Po to be held is a pressure at which bubbles are not generated in pumped-up water, and varies depending on properties and water quality of underground water.

After the pump 21 is operated (ON), Px is increased with the elapse of time as shown in FIG. 5. When the central control unit 43 determines that Px has recovered to a predetermined pressure higher than Po, the central control unit instructs the pump control unit 22 to turn off the pump 21. The instructed pump control unit 22 turns off the pump 21.

Similarly, the central control unit 43 may instruct the pump control unit 32 to turn on the pump 31 and may instruct the pump control unit 32 to turn off the pump 31.

Pressure holding control in the pipe 13 is performed when the pump is stopped, so that the geothermal heat utilization system 10 holds a pressure in the pipe 13 at a positive pressure at all times over the entire period.

(Urgent Stop Control)

In addition, the central control unit 43 transmits an instruction for forcibly stopping a pump of each well to the pump control unit 22 and the pump control unit 32 in a case where each well includes a water level sensor not shown in the drawings and a water level detected by the water level sensor exceeds an upper limit water level or a lower limit water level. Further, the central control unit 43 transmits an instruction for forcibly stopping a pump of each well to the pump control unit 22 and the pump control unit 32 in a case where a pressure in the pipe 13 exceeds an upper limit value or a lower limit value.

Therefore, the geothermal heat utilization system 10 can perform control in the range of a preset pressure in the pipe 13, preset water levels of the pumping well 20 and the water injection well 30. For this reason, when a pressure and a water level deviate from preset values, the geothermal heat utilization system 10 can detect an abnormality in a well or a pipe system (water leakage of a pipe, blockage of a well, a failure in a valve, or the like) and can immediately cope with the abnormality by performing urgent stopping.

(Operational Effects of Geothermal Heat Utilization System 10)

The geothermal heat utilization system 10 can pump up water stored in a well into the pressurized pipe 13 and can return the water stored in the pressurized pipe 13 to the well.

In addition, the geothermal heat utilization system 10 pumps up stored water pressurized by a pump into a pipe through a check valve and stops water, which is temporarily pumped up into the pipe, inside the pipe using the check valve.

Further, it is possible to return pumped-up stored water from a pipe to a well in a state where a set pressure for opening a water injection valve is applied.

For this reason, the geothermal heat utilization system 10 can limit the exposure of stored water, which is to be returned to a well, to air and the volatilization of gas components from stored water to be returned to a well.

Therefore, the geothermal heat utilization system 10 can limit the generation of bubbles when pumped-up stored water is returned to a well, and thus it is possible to limit a reduction in the efficiency of water injection of the pumped-up stored water into the well. In addition, it is possible to perform water injection without changing the quality of pumped-up water. Further, it is possible to limit the generation of fine particles such as iron oxide due to oxidation of pumped-up stored water.

<Geothermal Heat Utilization Method>

Figure 6:
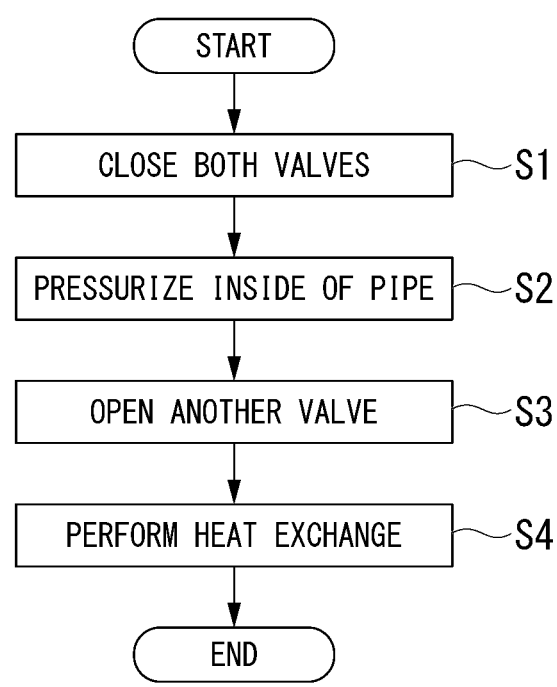
FIG. 6 is a flowchart of a geothermal heat utilization method according to the embodiment of the present invention.

A geothermal heat utilization method will be described using the geothermal heat utilization system 10 with reference to FIG. 6.

First, the valve 25 and the valve 35 are closed (S1: a both-valves closing step). As described above, in a case of the geothermal heat utilization system 10, the check valve 26, the water injection valve 27, the check valve 36, and the water injection valve 37 are automatically closed and the both-valves closing step is automatically performed, and thus it is not necessary to intentionally perform the both-valves closing step.

However, in a case where a geothermal heat utilization system in which the check valve 26, the water injection valve 27, the check valve 36, and the water injection valve 37 of the geothermal heat utilization system 10 are replaced with a simple regulating valve or an opening and closing valve is used, for example, the geothermal heat utilization system or a user needs to perform the both-valves closing step S1.

After the both-valves closing step S1 is performed, stored water is pumped up into the pipe 13 using a pump provided in one of the pumping well 20 and the water injection well 30 to pressurize the inside of the pipe 13 (S2: an in-pipe pressurization step).

After the in-pipe pressurization step S2 is performed, a valve provided in the other one of the pumping well 20 and the water injection well 30 is opened (S3: a the-other-valve opening step). As described above, in a case of the geothermal heat utilization system 10, when a pressure in the water injection valve 27 or the water injection valve 37 becomes higher than a set pressure, the water injection valve 27 or the water injection valve 37 is automatically opened and the-other-valve opening step S3 is automatically performed, and thus it is not necessary to intentionally perform the the-other-valve opening step S3.

However, in a case where a geothermal heat utilization system 10 in which the water injection valve 27 and the water injection valve 37 of the water injection valve 27 and water injection valve 37 are replaced with a simple regulating valve or an opening and closing valve is used, the geothermal heat utilization system or a user needs to perform the the-other-valve opening step S3.

After the the-other-valve opening step S3 is performed, stored water is pumped up into the pipe 13 using a pump provided in one of the pumping well 20 and the water injection well 30 to inject the stored water into the other one and perform heat exchange between the pipe 13 and the heat exchanger 14 (S4: a heat exchange step).

Modification Example of Geothermal Heat Utilization System

In the above-described embodiment, when a pressure in the pipe 13 becomes higher than a set pressure specific to a water injection valve, the water injection valve itself is operated to release water in the pipe 13 without control by a water injection valve control unit being performed. However, as a modification example, the water injection valve control unit may perform control of opening the water injection valve in relation to a determined pressure in a pipe.

Figure 7:
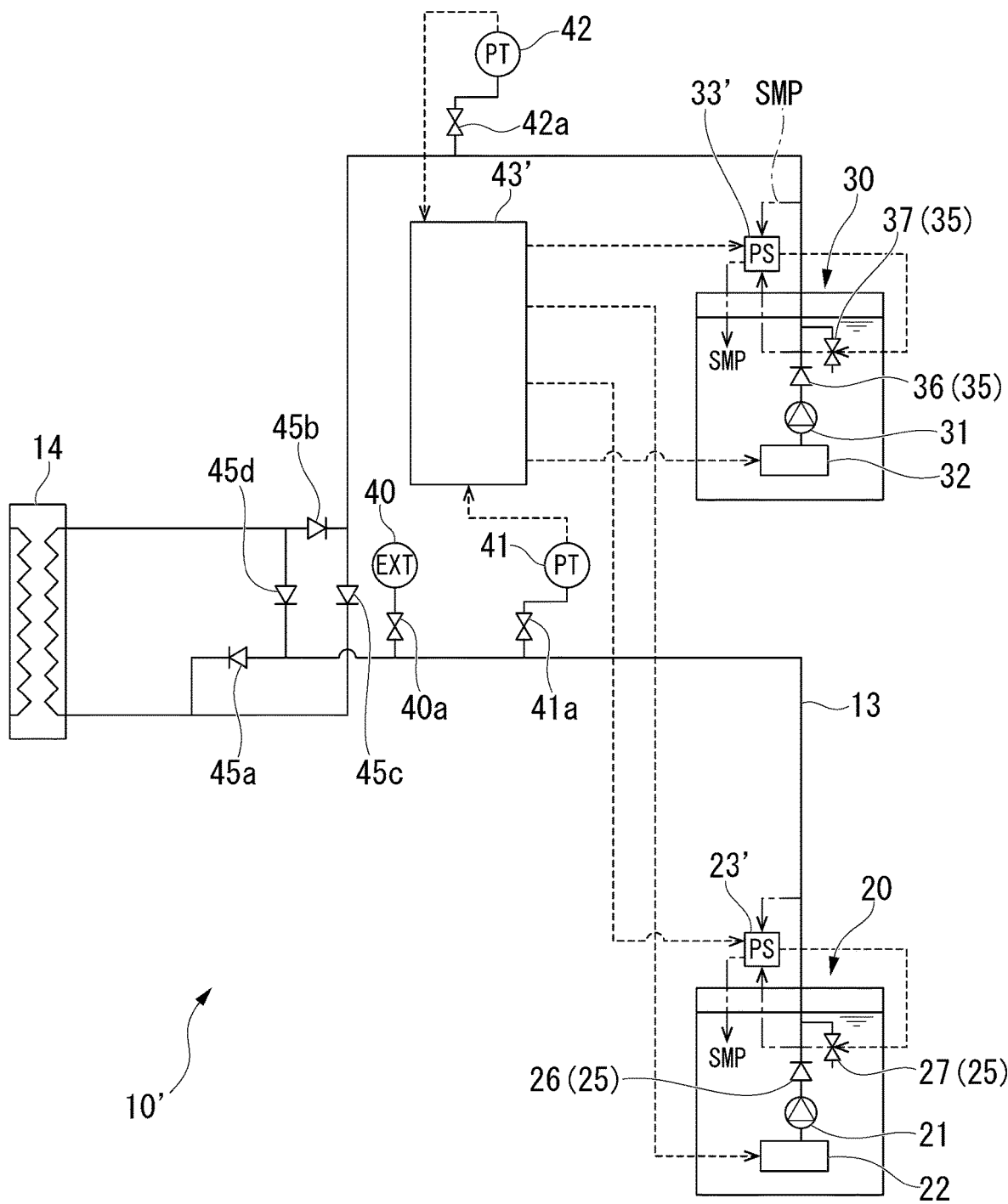
FIG. 7 is a system diagram of a geothermal heat utilization system according to a modification example of the embodiment of the present invention.

Specifically, as shown in FIG. 7, as a modification example, the geothermal heat utilization system 10' includes a central control unit 43', a water injection valve control unit 23' that controls a water injection valve 27, and a water injection valve control unit 33' that controls a water injection valve 37.

When the water injection valve control unit 33' is described, the geothermal heat utilization system 10' transmits an instruction for opening the water injection valve 37 from the central control unit 43' to the water injection valve control unit 33'.

When a pressure detected by a pressure gauge 41 or a pressure gauge 42 reaches a predetermined pressure, the central control unit 43' transmits an instruction for opening the water injection valve 37 to the water injection valve control unit 33'. The water injection valve control unit 33' having received the instruction for opening is configured to perform control of opening the water injection valve 37.

Further, the water injection valve control unit 33' may open the water injection valve 37 in relation to bubble generation conditions of sampled water in a pipe 13.

This is the same for the control of the water injection valve control unit 23'.

In addition, the geothermal heat utilization system 10' can return stored water in a well which is pumped up into the pipe 13 to the well while controlling water injection related to a determined pressure in the pipe 13. For this reason, the geothermal heat utilization system 10' can maintain water stored in the pipe 13 at a predetermined pressure. Therefore, the geothermal heat utilization system 10' can limit the generation of bubbles when pumped-up stored water is returned to a well.

Modification Example of Valve

Figure 8:
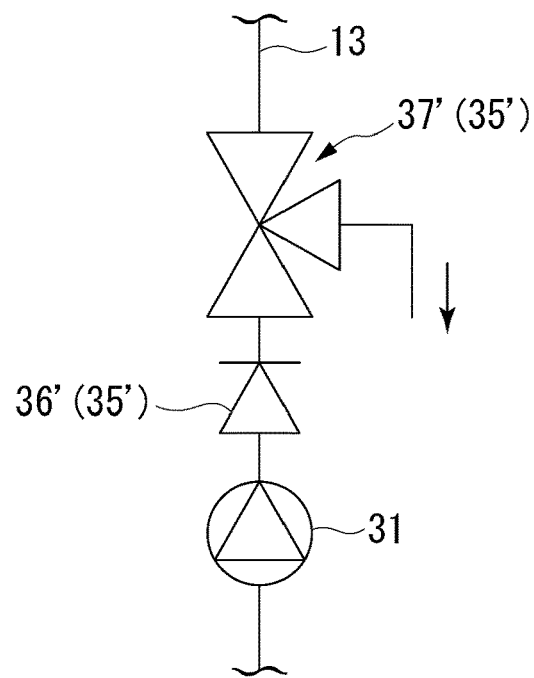
FIG. 8 is a diagram showing a modification example of a valve according to the embodiment of the present invention.

In the present embodiment, the check valve 36 and the water injection valve 37 are provided at respective branch destinations of the pipe 13 which branches out into two parts toward a tip end of the pipe 13 in the water injection well 30. However, as a modification example, a valve 35' may be provided at the tip end of the pipe 13 as shown in FIG. 8. The valve 35' includes a check valve 36' and a water injection valve 37' which is a three-way valve. The valve 35' is provided between the pump 31 and the tip end of the pipe 13, and is configured such that the check valve 36' and the water injection valve 37' are disposed in this order from the pump 31.

The check valve 36' and the water injection valve 37' are provided such that water flows from the pump 31 to the pipe 13 and does not flow from the pipe 13 to the pump 31. In addition, when a pressure in the pipe 13 becomes higher than a set pressure, the water injection valve 37' releases water in the pipe 13 from the pipe 13 to the water injection well 30 (in a direction indicated by an arrow). Thereby, when a pressure in the pipe 13 becomes higher than a set pressure, water in the pipe 13 is injected into the water injection well 30.

Figure 9:
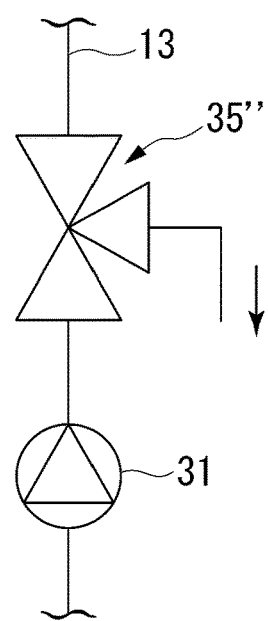
FIG. 9 is a diagram showing another modification example of a valve according to the embodiment of the present invention.

As another modification example, a three-way valve having a check valve function may be provided at the tip end of the pipe 13 as a valve 35" as shown in FIG. 9.

This is the same for a valve of the pumping well 20.

Although the embodiment of the present invention has been described in detail with reference to the drawings, a specific configuration is not limited to the above-described embodiment, and changes of design and the like are also included without departing from the scope of the present invention.

INDUSTRIAL APPLICABILITY

According to the above-described geothermal heat utilization system, it is possible to limit a reduction in the efficiency of water injection when pumped-up stored water is returned to a well.

REFERENCE SIGNS LIST

10 Geothermal heat utilization system
10' Geothermal heat utilization system
13 Pipe
14 Heat exchanger
20 Pumping well
20a Casing
20b Strainer
20c Lid
20e Cable
20f Bolt
20g Safety valve
21 Pump
22 Pump control unit
23 Water injection valve control unit
23' Water injection valve control unit
25 Valve
26 Check valve
27 Water injection valve
30 Water injection well
30a Casing
30b Strainer
31 Pump
32 Pump control unit
33 Water injection valve control unit
33' Water injection valve control unit
35 Valve
35' Valve
35" Valve
36 Check valve
36' Check valve
37 Water injection valve
37' Water injection valve
40 Accumulator pressure tank
40a Regulating valve
41 Pressure gauge
41a Regulating valve
42 Pressure gauge
42a Regulating valve
43 Central control unit
43' Central control unit
45a Check valve
45b Check valve
45c Check valve
45d Check valve
HOL Excavation hole
LY Aquifer
SMP Sample

What is claimed is:

1. A geothermal heat utilization system comprising:
a pair of wells;
a pipe having two ends which are immersed in stored water of both of the wells so as to connect the pair of wells to each other;
a pair of pumps which are provided in the respective wells and pump up the stored water through the pipe;
valves each of which is provided on a pressurization side of one of the pumps in one of the pair of wells; and
a heat exchanger which is configured to exchange heat with the pipe, wherein
at least one of the valves includes a water injection valve configured such that water in the pipe is injected into the well, the water injection valve being immersed in stored water of the well,
the geothermal heat utilization system further comprises a lid in an opening in an upper portion of at least one well out of the wells, and
the lid limits contact of the stored water with air to limit the generation of particles due to oxidation of the stored water.

2. The geothermal heat utilization system according to claim 1, wherein at least one of the valves includes a check valve capable of being pressurized from the pump to the pipe, the check valve being immersed in stored water of the well.

3. The geothermal heat utilization system according to claim 2, wherein
the water injection valve is opened at a set pressure, and
the set pressure is higher than an operating pressure of the check valve, the operating pressure which is applied from the pump to the pipe.

4. The geothermal heat utilization system according to claim 3, further comprising:
an accumulator pressure tank in the pipe.

5. A geothermal heat utilization method using the geothermal heat utilization system according to claim 3, the geothermal heat utilization method comprising:
an in-pipe pressurization step of pumping up the stored water into the pipe using the pump provided in one of the pair of wells to pressurize an inside of the pipe; and
a heat exchange step of further pumping up the stored water into the pipe using the pump provided in one of the pair of wells after the in-pipe pressurization step to inject the stored water into the other well and perform heat exchange between the pipe and the heat exchanger.

6. The geothermal heat utilization system according to claim 2, wherein
the geothermal heat utilization system further comprises a pressure gauge which is configured to determine a pressure in the pipe and a water injection valve control unit which is configured to control the water injection valve in relation to the determined pressure, and
the water injection valve control unit is configured to perform control of opening the water injection valve provided inside one well with respect to the other well operating the pump out of the pair of wells when the determined pressure reaches a predetermined pressure.

7. The geothermal heat utilization system according to claim 2, further comprising:
an accumulator pressure tank in the pipe.

8. A geothermal heat utilization method using the geothermal heat utilization system according to claim 2, the geothermal heat utilization method comprising:
an in-pipe pressurization step of pumping up the stored water into the pipe using the pump provided in one of the pair of wells to pressurize an inside of the pipe; and
a heat exchange step of further pumping up the stored water into the pipe using the pump provided in one of the pair of wells after the in-pipe pressurization step to inject the stored water into the other well and perform heat exchange between the pipe and the heat exchanger.

9. The geothermal heat utilization system according to claim 1, wherein
the geothermal heat utilization system further comprises a pressure gauge which is configured to determine a pressure in the pipe and a water injection valve control unit which is configured to control the water injection valve in relation to the determined pressure, and
the water injection valve control unit is configured to perform control of opening the water injection valve provided inside one well with respect to the other well operating the pump out of the pair of wells when the determined pressure reaches a predetermined pressure.

10. The geothermal heat utilization system according to claim 9, further comprising:
an accumulator pressure tank in the pipe.

11. A geothermal heat utilization method using the geothermal heat utilization system according to claim 9, the geothermal heat utilization method comprising:
an in-pipe pressurization step of pumping up the stored water into the pipe using the pump provided in one of the pair of wells to pressurize an inside of the pipe; and
a heat exchange step of further pumping up the stored water into the pipe using the pump provided in one of the pair of wells after the in-pipe pressurization step to inject the stored water into the other well and perform heat exchange between the pipe and the heat exchanger.

12. The geothermal heat utilization system according to claim 1, further comprising:
an accumulator pressure tank in the pipe.

13. A geothermal heat utilization method using the geothermal heat utilization system according to claim 12, the geothermal heat utilization method comprising:
an in-pipe pressurization step of pumping up the stored water into the pipe using the pump provided in one of the pair of wells to pressurize an inside of the pipe; and
a heat exchange step of further pumping up the stored water into the pipe using the pump provided in one of the pair of wells after the in-pipe pressurization step to inject the stored water into the other well and perform heat exchange between the pipe and the heat exchanger.

14. A geothermal heat utilization method using the geothermal heat utilization system according to claim 1, the geothermal heat utilization method comprising:
an in-pipe pressurization step of pumping up the stored water into the pipe using the pump provided in one of the pair of wells to pressurize an inside of the pipe; and
a heat exchange step of further pumping up the stored water into the pipe using the pump provided in one of the pair of wells after the in-pipe pressurization step to inject the stored water into the other well and perform heat exchange between the pipe and the heat exchanger.

* * * * *